H. C. MALLORY.
HOT BLAST HEATING SYSTEM.
APPLICATION FILED MAR. 20, 1907.
1,061,679.
Patented May 13, 1913.
2 SHEETS—SHEET 1.
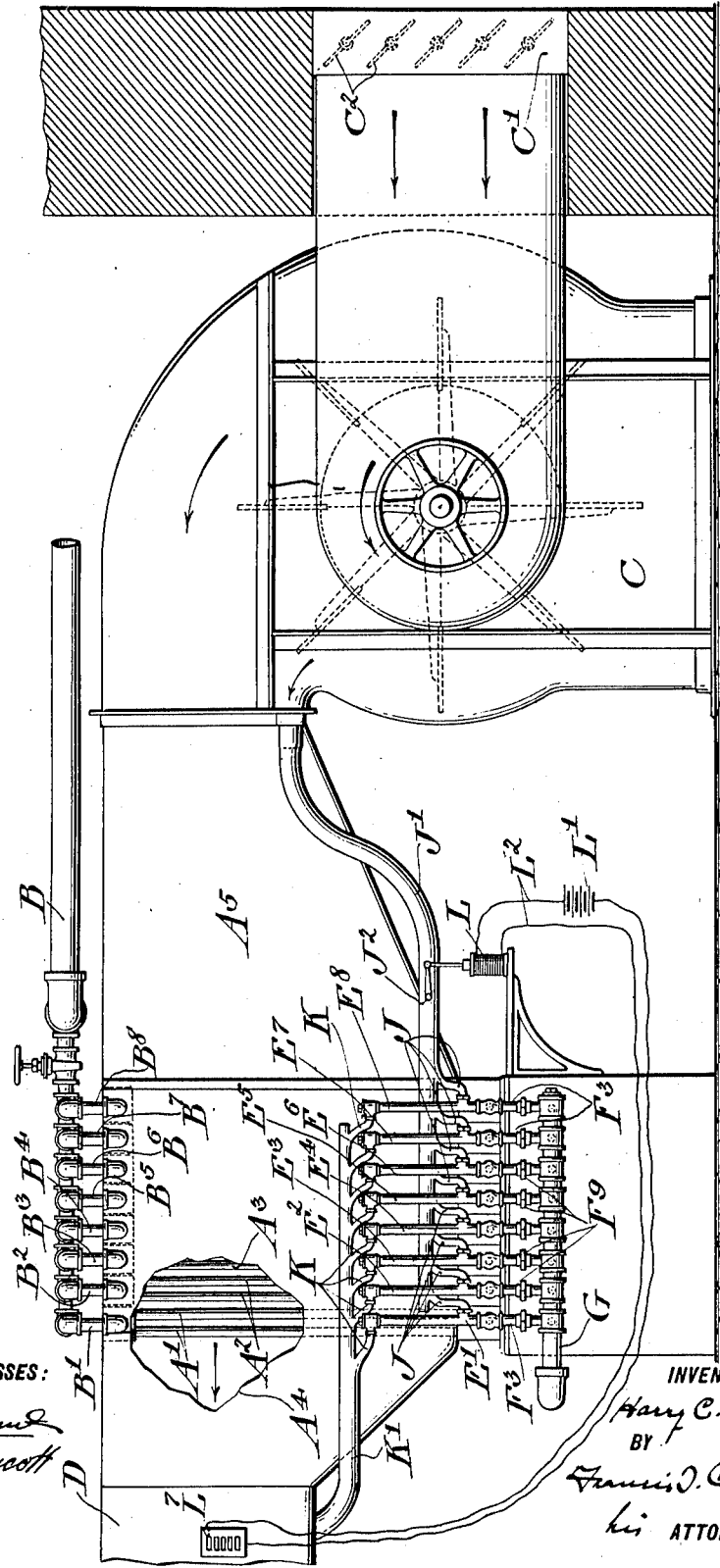

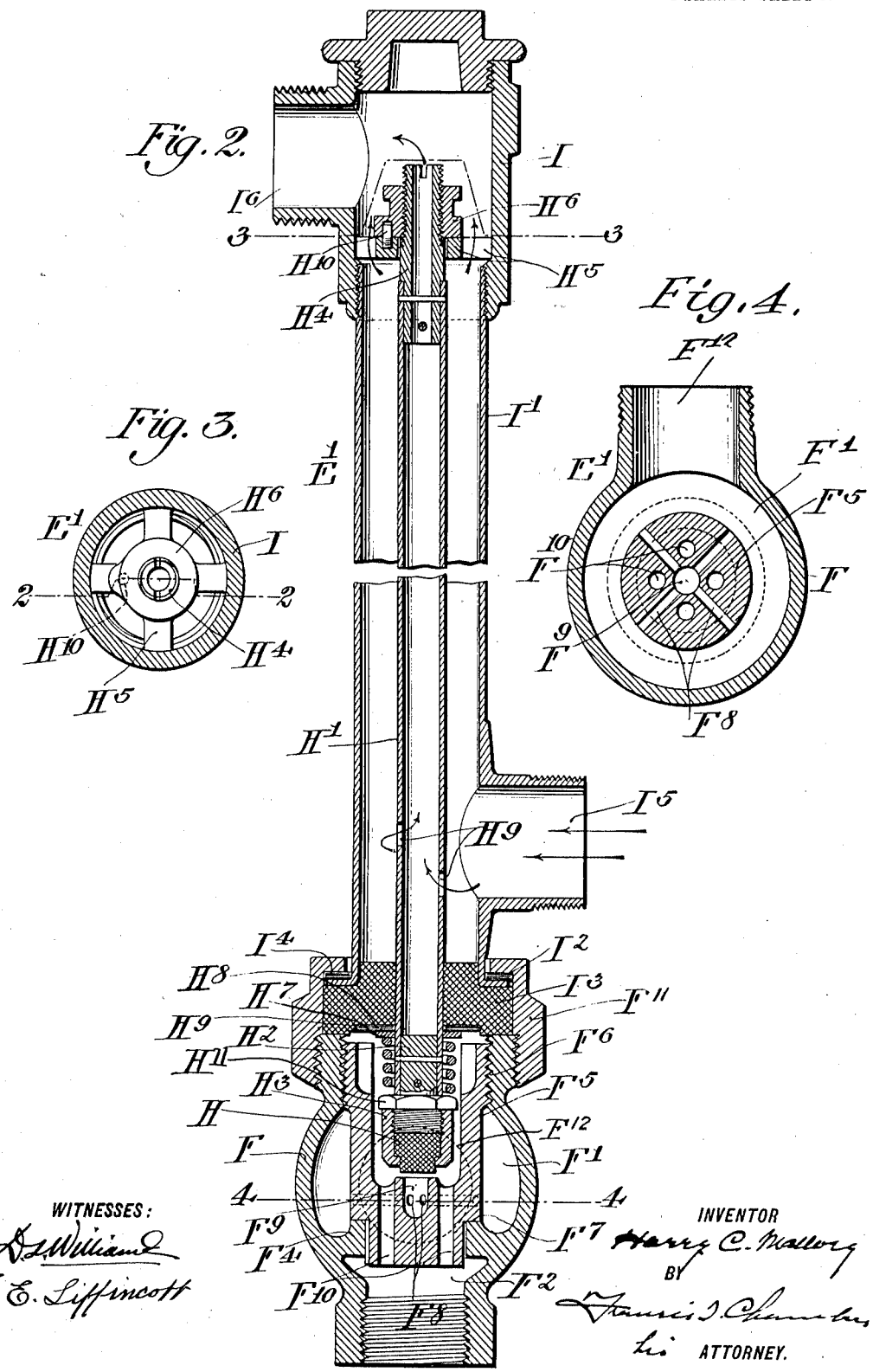

UNITED STATES PATENT OFFICE.

HARRY C. MALLORY, OF NEW YORK, N. Y.

HOT-BLAST HEATING SYSTEM.

1,061,679. Specification of Letters Patent. Patented May 13, 1913.

Application filed March 20, 1907. Serial No. 363,460.

*To all whom it may concern:*

Be it known that I, HARRY C. MALLORY, a citizen of the United States of America, residing in New York, in the county of New York and State of New York, have invented a certain new and useful Improvement in Hot-Blast Heating Systems, of which the following is a true and exact description, reference being had to the accompanying drawings, which form a part thereof.

My present invention relates to heating apparatus and is particularly designed for use with heating apparatus of that type in which a blast or stream of air is moved by a fan or similar device over a heater and thence into the apartment or apartments to be heated, though in some aspects my invention is not limited to this type of apparatus.

The object of my invention is to provide simple and effective means for regulating the heater so that the air will at all times be heated to the desired temperature and this with an economical and efficient use of the heater.

In the preferred form in which I carry out my invention I provide a heater, consisting of sections and arrange for bringing as many of such sections into use at one time as may then be necessary. Each section consists of a coil or series of coils of pipe through which a circulating fluid, such as steam, circulates, and the flow of the steam through each section is controlled by a thermostatically actuated valve which directly controls the flow of the heating fluid through the section, advantageously by regulating the escape of water of condensation and steam from the section into an escape pipe. The thermostatically actuated valves are subjected to the action of a cooling medium which acts thermally on the valve mechanism in a manner tending to open the valves. The valves are preferably of the throttling type so that variations in the temperature of the thermostatic mechanism therefor produces a graduated variation in the flow of the heating fluid into the sections. Preferably, I arrange the valves for the different sections so that the valves are brought into operation progressively as the temperature of the actuating mechanism falls, so that the number of valves in operation and the number of effective heater sections depends on the temperature of the said cooling medium, the parts being so arranged, however, that each valve closes to prevent the escape of steam from the heater section controlled by it.

In the preferred form of my invention, I subject the thermostatic actuating mechanism of the various valves to the action of a stream of air which is drawn from the external atmosphere and may be part of the air set in motion by the fan for producing the blast. The use of air of the temperature of the external atmosphere possesses the advantage that a variation in its temperature produces, of itself, an automatic regulation since a variation in the temperature of this air not only varies the amount of heat necessary from the heater to heat the blast to the desired temperature, but also produces a corresponding change in the temperature of the actuating mechanism of the valves.

When desired, I obtain a further regulation in response to the temperature actually imparted to the blast or to the apartments to be heated by the blast, as by employing a thermostat subjected to the temperature of the blast to the apartment to be heated, for varying the flow of the stream of cold air acting on the thermostatic valve actuating mechanism.

The various features of novelty which characterize my invention are pointed out with particularity in the claims annexed to and forming a part of this specification.

For a better understanding of my invention and the advantages possessed by it, reference may be had to the accompanying drawings and descriptive matter in which I have illustrated and described one of the forms in which my invention may be carried out.

Of the drawings, Figure 1 is an elevation, partly broken away and in section, showing, somewhat diagrammatically, the assembled apparatus. Fig. 2 is a sectional elevation of one of the thermostatically actuated controlling valves, the section being taken on the line 2—2 of Fig. 3. Fig. 3 is a section on the line 3—3 of Fig. 2 and Fig. 4 is a section on the line 4—4 of Fig. 2.

The heater shown in the drawing comprises a plurality of sections $A^1$, $A^2$, $A^3$, etc., located within a casing $A^4$. Steam is supplied to the sections $A^1$, $A^2$, $A^3$, etc., from a supply pipe B, through inlet pipes $B^1$, $B^2$, $B^3$, $B^4$, $B^5$, $B^6$, $B^7$ and $B^8$ respectively. Air is blown into the casing $A^4$ through the conduit $A^5$ by a fan located in the casing C, and drawing air from the external atmosphere through the wall opening $C^1$, the entrance of air being regulated as desired by dampers $C^2$ located in the wall opening. The heated air passes from the casing $A^4$ to the apartment to be heated through a conduit D leading from the outlet end of the heater. To the sections are connected individual controlling valves $E^1$, $E^2$, $E^3$, $E^4$, $E^5$, $E^6$, $E^7$ and $E^8$.

The controlling valves may all be identical except in adjustment, as hereafter explained, and a description of the valve $E^1$ shown in Figs. 2, 3 and 4, will suffice for all the valves. The valve comprises a valve casing F having an inlet chamber $F^1$ into which opens the inlet port $F^{12}$ and an outlet chamber $F^2$. The outlet chambers of all the valves are connected by pipes $F^3$ to the common low pressure escape or return conduit G, which may be connected to a vacuum pump or other means for maintaining a pressure below that of the atmosphere in the conduit G. The chambers $F^1$ and $F^2$ are separated by an apertured diaphragm $F^4$. A cup shaped member $F^5$ in threaded engagement with the valve casing F at $F^6$ is provided with a reduced portion which passes through the aperture in the diaphragm $F^4$ and has a shoulder which makes a tight joint at $F^7$ with the upper surface of the diaphragm. Ports $F^8$ lead from the chamber $F^1$ to a recess $F^9$ formed in the lower end of the wall of the member $F^5$. As shown, the wall surrounding the recess $F^9$ extends above the bottom of the main cavity formed in the member $F^5$, and ports $F^{10}$ lead from the bottom wall of the cavity to the outlet chamber $F^2$.

Communication between the inlet and outlet chambers through the ports $F^8$ and $F^{10}$ is controlled by a valve H, which is adapted to seat upon the upper edge of the wall surrounding the recess $F^9$ and is carried at the lower end of the elongated hollow rod $H^1$ formed of material having a relatively high thermal coefficient of expansion by means of a coupling comprising a plug $H^2$ secured in the lower end of the hollow rod and a nut $H^3$ threaded onto the lower end of the plug $H^2$. The upper end of the rod $H^1$ or rather a threaded extension $H^4$ of the rod, passes through a spider $H^5$ and is supported by the spider by means of a nut $H^6$ adjustably secured on the extension $H^4$. The spider $H^5$ is supported by a casing I, which is threaded on the upper end of a tubular member $I^1$, surrounds the rod $H^1$, and is formed of material having a relatively low coefficient of thermal expansion. The lower end of the tubular member $I^1$ has an out-turned flange $I^2$ and rests upon a bushing $I^3$ of some material having poor heat conductivity, such as some compressed fiber compound. The bushing $I^3$ rests on the upper end of the member F and is held in place by a nut $F^{11}$ threaded on the upper end of the member F. A washer $I^4$ of material similar to that forming the bushing $I^3$ is located between the cap F and the flange $I^2$. A helical spring extending between the upper end of a collar $H^{11}$ on plug $H^2$ and a washer $H^7$ serves at all times to urge the valve H toward its seat, and to properly support a packing washer $H^8$ against the under side of the bushing $I^3$.

The tubular member $I^1$ is provided at its lower end with an inlet opening $I^5$. Ports $H^9$ are formed in the hollow rod $H^1$ adjacent the inlet $I^5$ so that air may pass from the annular space between the rod $H^1$ and the tubular member $I^1$ to the interior of the hollow rod. The air entering the member $I^1$ through the inlet port $I^5$ passes into the casing I through the hollow rod and through the spaces between the legs of the spider $H^5$ at the side of the rod. The effective length of the rod $H^1$, and thereby the amount of expansion and contraction necessary to open and close the valve, may be varied by rotating the rod in the nut $H^6$, a pin $H^{10}$ connecting the spider and the nut so as to prevent rotation of the nut while allowing it to lift from the spider upon any elongation of the rod occurring after the valve H has seated itself. The inlet members $I^5$ of the various valves are connected by branch pipes J to a pipe $J^1$ leading from the outlet side of the fan casing C. Similarly the outlet ports $I^6$ of the casings I of the various controlling valves are connected by pipes K to a pipe $K^1$ which leads to the conduit D. Pipe $J^1$, branch pipes J, tubular members $I^1$ and casings I, branch pipes K and pipe $K^1$ thus form a bypass around the heater from the outlet side of the fan casing to the conduit D. If desired, a regulation of the amount of air flowing through this bypass may be controlled as by means of a damper $J^2$ in the pipe $J^1$, solenoid L, battery or other source of current $L^1$, conductors $L^2$ and thermostatically actuated rheostat $L^7$ so located as to respond to the temperature produced by the heater, for instance, the thermostatic rheostat may be placed within, or at the side of the conduit D.

The operation of the form of my invention disclosed is as follows: Air is drawn from the external atmosphere through the wall opening $C^1$ by the fan C, and forced through the heater casing $A^4$ into the conduit D and thence into the apartment or apartments to be heated. A portion of the air discharged by the fan passes through the bypass which includes the tubular members $I^1$. This air acts thermally upon the hollow rods $H^1$ as it flows along them, tending to bring the temperature of the rods to that of the air. As the rods are cooled by the moving air in contact with them they tend to contract and lift the valves connected to them off the seats, thus opening the corresponding heater sections to the escape pipe G. When the valves open, the water of condensation first escapes from the heater sections and then steam. The passage of hot fluid into the cavities of the valve members $F^5$ tends to warm the lower ends of the rods $H^1$, and I preferably so proportion and arrange the part that the presence of steam in the cavities in the valve members $F^5$ will in all cases heat the rods $H^1$ sufficiently to counteract the effect of the air flowing along them and cause the valves to seat so that in normal operation each valve closes as soon as steam begins to flow through the port controlled by it.

In the preferred form of my invention, the valves $E^1$, $E^2$, $E^3$, etc., are so adjusted that all will open when the air supplied to them by the pipe $J^1$ is at a certain predetermined low temperature, and will all be closed and remain closed at a certain high temperature; and as the temperature of the external atmosphere falls below this higher temperature, the valves are successively brought into operation. It will be understood that by bringing a valve into operation I do not mean to maintain it at all times open, but to cause it to open when the heater section controlled by it contains water of condensation, the valve thereafter intermittently closing and opening to prevent the escape of steam from the heater section, while at the same time permitting the escape of the water of condensation. By this arrangement I prevent the escape of steam from any of the heater sections and operate the heater as a whole in a highly efficient manner. With this arrangement it will be understood that at certain intermediate temperatures certain of the heater sections will be working at their full heat producing capacity, and all the remainder but one are entirely out of operation and one heater section will be working at some fraction of its maximum heat producing capacity depending upon the minor variations in the temperature or volume of the air passing through the casing $I^1$ of the corresponding valve.

Certain features of the invention described but not claimed herein are described and claimed in certain prior applications of mine, bearing Serial Numbers 158,039, 158,040, 171,186, 344,821 and 356,318.

While the particular form of my invention disclosed is highly effective, it will be obvious to those skilled in the art that changes may be made without departing from the spirit of my invention and I do not wish the claims hereinafter made to be limited to the particular embodiment disclosed, more than is made necessary by the state of the art.

Having now described my invention, what I claim as new and desire to secure by Letters Patent is,

1. In a hot blast heating system, a heater, a thermostatic valve mechanism directly controlling the flow of the heating fluid through the heater, a fan for moving air through the heater, a pipe arranged to direct a stream of the air set in motion by the fan against the thermostatic valve mechanism, and means for varying the flow of air through said pipe in response to variations in the temperature produced by said heater.

2. In combination, a steam heater, comprising a plurality of sections, and a separate thermostatically actuated valve for controlling the escape of water of condensation from each section, the thermostatic valve mechanism being so set that different valves open at different temperatures, and the parts being so arranged and proportioned that the thermostatic mechanism of each valve will be heated to the valve closing temperature by steam passing through the port controlled by it.

3. In combination, a steam heater comprising a plurality of sections, a separate thermostatically actuated valve for controlling the escape of water of condensation from each section and means for causing a cooling fluid to flow along the thermostatic mechanism of all the valves, the different valves being set to open at different temperatures of said cooling medium and the parts being so arranged and proportioned that the thermostatic mechanism of each valve will be heated to the valve closing temperature by steam passing through the port controlled by it.

4. In combination, a steam heater comprising a plurality of sections, a separate thermostatically actuated valve for controlling the escape of water of condensation from each section, means for causing a cooling fluid to flow along the thermostatic mechanism of all the valves, the different valves being set to open at different temperatures of said cooling medium and the parts being so arranged and proportioned that the thermostatic mechanism of each valve will be heated to the valve closing temperature by steam passing through the port controlled by it, and means for varying the rate of flow of said cooling medium in response to variations in the temperature produced by said heater.

5. In combination, a heater comprising sections, a controlling valve for each section, thermostatic actuating mechanism for the valves including an expansible member and a surrounding casing for each valve, said casings each having inlet and outlet ports, an air moving device for moving air by said heater and a conduit for conveying a portion of the air set in motion by said device to the inlet ports of said casings.

6. In combination, a heater comprising sections, a controlling valve for each section, thermostatic actuating mechanism for the valves including an expansible member and a surrounding casing for each valve, said casings each having inlet and outlet ports, an air moving device for moving air by said heater, a conduit for conveying a portion of the air set in motion by said device to the inlet ports of said casings, and means for varying the flow of air through said conduit as the temperature conditions produced by the heater may require.

7. In a hot blast heating apparatus, a heater, a casing in which said heater is located, a thermostatic valve located without said casing for directly controlling the flow of the heating fluid through the heater, means for forcing air drawn from the external atmosphere through said casing and a bypass having its ends connected to said casing at opposite sides of said heater, and arranged to convey air in heat transferring proximity to the thermostatic valves.

8. In a hot blast heating apparatus, a heater, a casing in which said heater is located, thermostatic valve actuating mechanism for the heater, located without said casing, means for forcing air drawn from the external atmosphere through said casing, a bypass having its ends connected to said casing at opposite sides of said heater, and arranged to convey air in heat transferring proximity to the thermostatic actuating mechanism for the valves, and means for varying the flow of air through said bypass in response to variations in the temperature produced by said heater.

9. In combination, a steam heater comprising a plurality of sections, and a separate thermostatic valve for controlling the flow of heating fluid through each section, the thermostatic valve mechanism being so set that different valves open at different temperatures, and the parts being so arranged and proportioned that the thermostatic mechanism of each valve will be heated to the valve closing temperature by steam passing through the heater.

10. In combination, a steam heater comprising a plurality of sections, a separate thermostatic valve for controlling the flow of heating fluid through each section and means for causing a cooling fluid to flow along the thermostatic mechanism of all the valves, the different valves being set to open at different temperatures of said cooling medium and the parts being so arranged and proportioned that the thermostatic mechanism of each valve will be heated to the valve closing temperature by steam passing through the heater.

11. In combination, a steam heater comprising a plurality of sections, a separate thermostatically actuated valve for controlling the flow of heating fluid through each section, means for causing a cooling fluid to flow along the thermostatic mechanism of all the valves, the different valves being set to open at different temperatures of said cooling medium and the parts being so arranged and proportioned that the thermostatic mechanism of each valve will be heated to the valve closing temperature by steam passing through the heater, and means for varying the rate of flow of said cooling medium in response to variations in the temperature produced by said heater.

HARRY C. MALLORY.

Witnesses:
WM. O. SHIPMAN,
O. G. SMITH.